United States Patent
Furuyama et al.

(10) Patent No.: US 8,248,628 B2
(45) Date of Patent: Aug. 21, 2012

(54) IMAGE PROCESSOR, IMAGE PROCESSING METHOD, AND COMPUTER READABLE MEDIA STORING PROGRAMS THEREFOR

(75) Inventors: Takeshi Furuyama, Ebina (JP); Hiromi Kita, Ebina (JP); Tsutomu Kimura, Ebina (JP); Shintaro Adachi, Ebina (JP); Kenji Yamada, Ebina (JP); Masakatsu Kanda, Ebina (JP); Tadaomi Suzuki, Ebina (JP); Hiroshi Hayashi, Ebina (JP); Shinji Hanaoka, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1400 days.

(21) Appl. No.: 11/651,469

(22) Filed: Jan. 10, 2007

(65) Prior Publication Data
US 2008/0007759 A1    Jan. 10, 2008

(30) Foreign Application Priority Data
Jun. 29, 2006    (JP) .................. 2006-179300

(51) Int. Cl.
G06K 15/00    (2006.01)
G06F 3/12    (2006.01)
(52) U.S. Cl. ...................................... 358/1.14
(58) Field of Classification Search .............. 358/1.14, 358/1.15, 1.16
See application file for complete search history.

(56) References Cited

U.S. PATENT DOCUMENTS

| 6,348,971 | B2* | 2/2002 | Owa et al. ............... 358/1.15 |
| 7,567,355 | B2* | 7/2009 | Matsunoshita ........... 358/1.13 |
| 2002/0016799 | A1* | 2/2002 | Nakagiri et al. .......... 707/517 |
| 2002/0067502 | A1* | 6/2002 | Hansen .................... 358/1.15 |

FOREIGN PATENT DOCUMENTS

| JP | A 2003-280469 | 10/2003 |
| JP | A 2004-72343 | 3/2004 |

* cited by examiner

Primary Examiner — Benny Q Tieu
Assistant Examiner — Sunil Chacko
(74) Attorney, Agent, or Firm — Oliff & Berridge, PLC

(57) ABSTRACT

An image processor includes an image reading unit that reads source documents and converts read data into image data, an extracting unit that extracts password information and attribute information from the image data of each of the source documents read by the image reading unit, a password inputting unit that inputs the password information, a password determining unit that determines whether or not the password information inputted by the password inputting unit matches the password information extracted by the extracting unit, and a permitting unit that permits a source document to be subjected to image processing, if the attribute information of the source document is identical to the attribute information included in the source document of which the password determining unit has determined that there is a match between the inputted password information and the extracted password information.

15 Claims, 7 Drawing Sheets

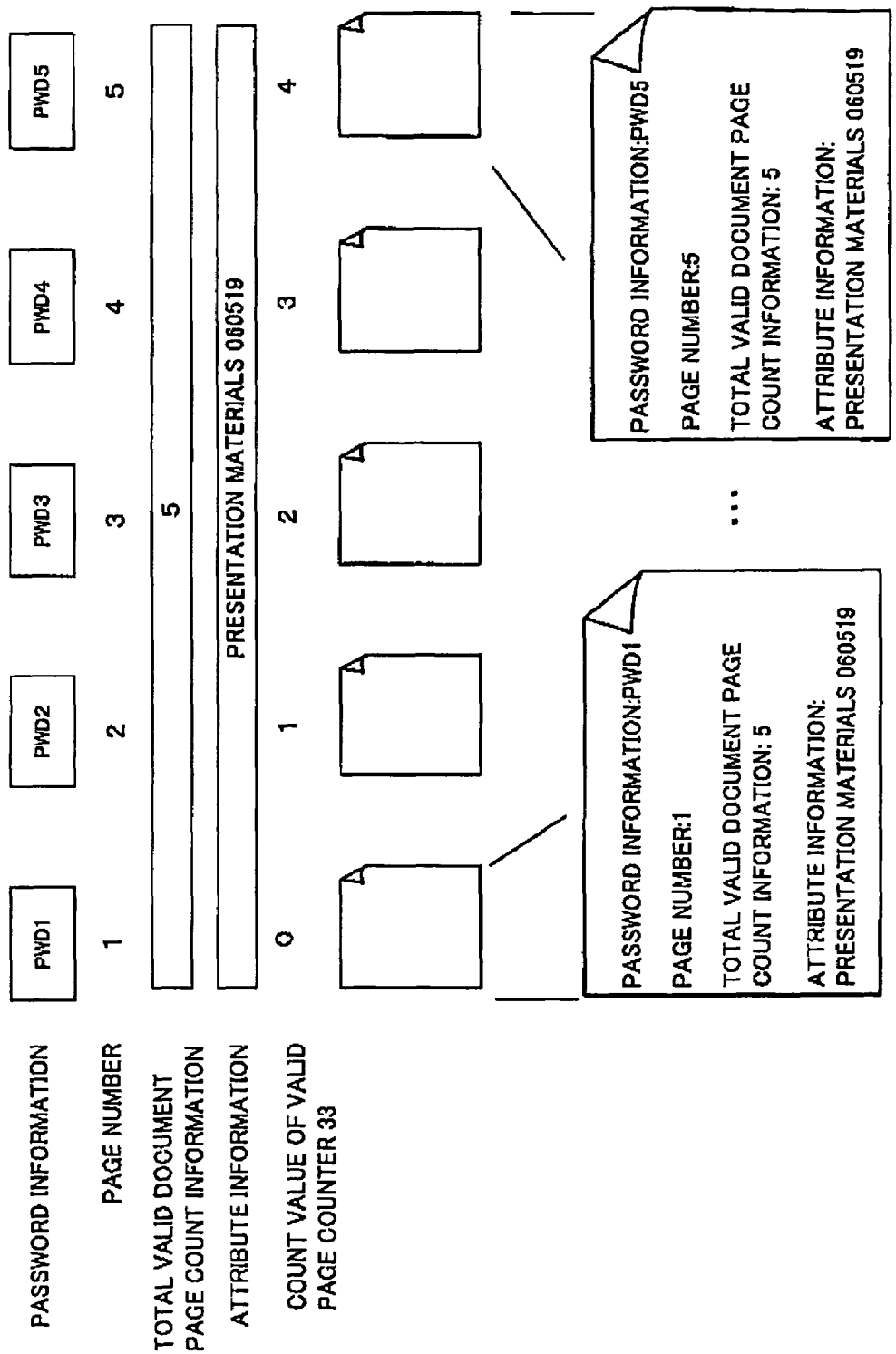

IMAGE PROCESSOR, IMAGE PROCESSING METHOD, AND COMPUTER READABLE MEDIA STORING PROGRAMS THEREFOR

BACKGROUND

1. Technical Field

The present invention relates to an image processor and an image processing method that subject image data obtained by reading a source document, to image processing, such as printing and transmission of the image data, as well as computer readable media storing programs therefor.

2. Related Art

In recent years, there is a growing problem that a document and the like with confidential information recorded in them can be easily copied due to the widespread use of a copying machine. Therefore, various ways for preventing such copying are being proposed.

For example, as a conventional copy-inhibiting method, there is a way to embed secrecy canceling information such as a password in a confidential document, by use of a glyph code, an encoded code such as one-dimensional code or two-dimensional code, a dot pattern, or the like.

Here, the glyph code is a code that represents binary numbers "0" and "1", by use of two types of small slash, i.e., diagonally right up slash (slash) and diagonally left up slash (back slash), and one slash expresses one-bit information.

In the method above, when the confidential document is to be copied or scanned, a user who wants to perform copying or scanning is prompted to enter copy restrictive information such as a password (authentication code), and only the user who enters the password that matches the password being embedded is permitted to perform copying or scanning.

SUMMARY

The present invention aims to provide an image processor and an image processing method that allow easy copying and scanning without a burden on a user, even in the case where multiple confidential documents each with a setting of a password are copied or scanned.

According to an aspect of the present invention, there is provided an image processor, including: an image reading unit that reads source documents and converts read data into image data, an extracting unit that extracts password information and attribute information from the image data of each of the source documents read by the image reading unit, a password inputting unit that inputs the password information, a password determining unit that determines whether or not the password information inputted by the password inputting unit matches the password information extracted by the extracting unit, and a permitting unit that permits a source document to be subjected to image processing, if the attribute information of the source document is identical to the attribute information included in the source document of which the password determining unit has determined that there is a match between the inputted password information and the extracted password information.

BRIEF DESCRIPTION OF THE DRAWINGS

An exemplary embodiment of the present invention will be described in detail based on the following figures, wherein:

FIG. 7 illustrates an operation of the image processor according to one exemplary embodiment of the present invention.

DETAILED DESCRIPTION

[Background]

In order to facilitate the understanding of the present invention, a background and an overview thereof will be explained. As described above, if secrecy canceling information such as a password is embedded in a confidential document in order to prevent copying, cumbersome procedure is required when multiple confidential documents are simultaneously copied.

Figure 1:
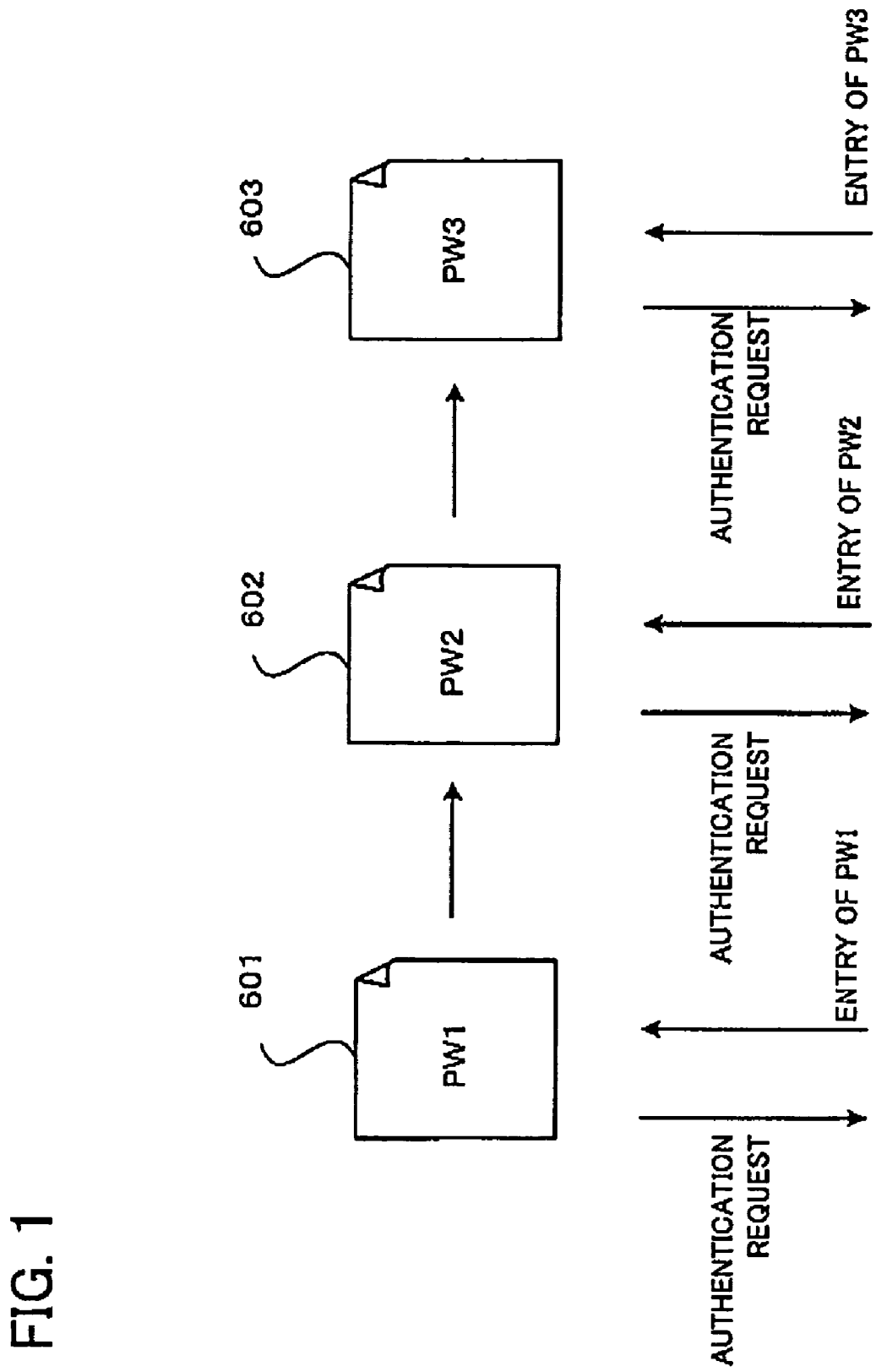
FIG. 1 illustrates required authentication processes when confidential documents having passwords different from one another are copied.

For example, an explanation will be made taking an example as shown in FIG. 1, where confidential documents 601 to 603 are copied simultaneously. In this example, it is assumed that password 1 (PW1) to password 3 (PW3) are respectively embedded in the confidential documents 601 to 603.

In the example above, a copying machine requests an authentication of a user every time when each of the confidential documents 601 to 603 is read. Therefore, the user has to enter PW1, PW2, and PW3, sequentially, every time when the authentication is requested.

Figure 2:
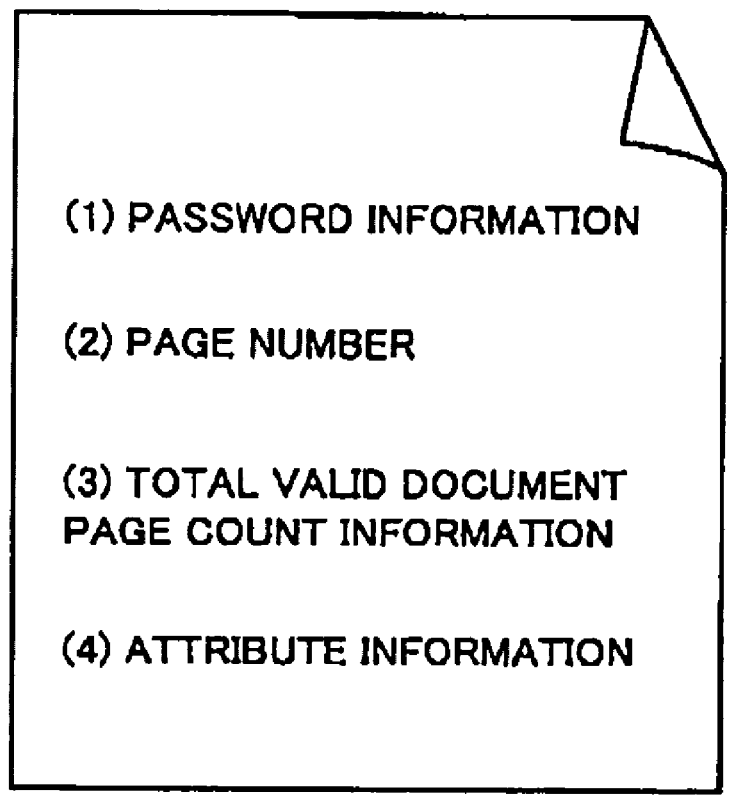
FIG. 2 illustrates information items that are embedded in a source document of which copying is to be restricted.

In view of the situation above, there is proposed a method according to an aspect of the present invention, to reduce trouble of entering password information in the case where a group of source documents (a batch of source documents) including multiple source documents is copied. According to an aspect of the present invention as shown in FIG. 2, not only password information but also code information, which includes a page number, total valid document page count information, and attribute information are embedded in a source document that requires a copy restriction.

Here, the page number indicates what number of page where a certain document is positioned among a group of documents to which the document belongs.

The total valid document page count information indicates the page count of document of which copying is permitted if identical password information is used, out of the documents constituting one document group. For example, if a document group is constituted by twenty pages of documents and an entry of one password information item permits copying of all the documents, each document is provided with "20" as the total valid document page count information.

The attribute information is information that indicates to which document group a document belongs. Therefore, the attribute information of the same value is embedded in each of multiple documents belonging to one document group.

[Exemplary Embodiment]

Figure 3:
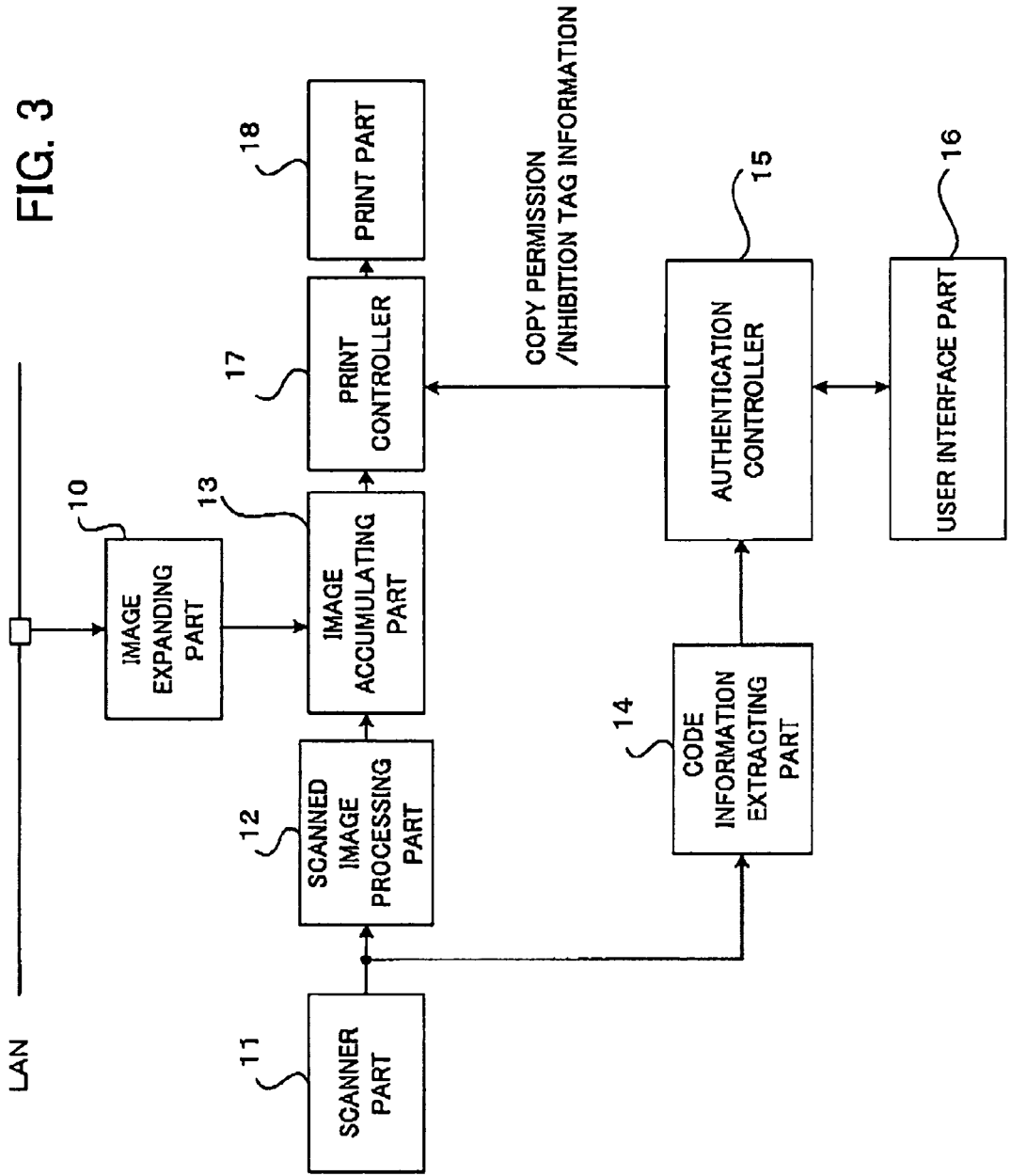
FIG. 3 is a block diagram showing a configuration of an image processor according to one exemplary embodiment of the present invention.

Next, an exemplary embodiment of the present invention will be explained in detail with reference to accompanying drawings. FIG. 3 is a block diagram showing a configuration of an image processor according to one exemplary embodiment of the invention.

As shown in FIG. 3, the image processor according to the present exemplary embodiment incorporates an image expanding part 10, a scanner part 11, a scanned image processing part 12, an image accumulating part 13, a code information extracting part 14, an authentication controller 15, a user interface part 16, a print controller 17, and a print part 18.

The image expanding part 10 inputs print data described in PDL (Page Description Language) via a network such as LAN. The image expanding part 10 carries out a process to expand the print data being inputted and generates image data. The generated image data is outputted to the image accumulating part 13 and accumulated therein.

The scanner part 11 reads a document placed on a platen glass and outputs the read image data to the scanned image processing part 12. The scanned image processing part 12 subjects the inputted image data to color correction, color space conversion, screen treatment, and the like, and accumulates the image data after subjected to the image processing in the image accumulating part 13.

The code information extracting part 14 extracts code information from the image data read by the scanner part 11, the code information including the password information, the attribute information, the total valid document page count information, and the page number, and outputs the code information to the authentication controller 15.

The user interface part 16 incorporates a touch panel, a liquid crystal display, and a keyboard, prompts a user to enter a password, and inputs the password entered by the user.

The authentication controller 15 determines whether copying is permitted or inhibited with respect to each read document, based on the code information extracted by the code extracting part 14 and the password information inputted from the user interface part 16, and issues the result of the determination in a form of copy permission/inhibition tag information.

The print controller 17 reads the image data from the image accumulating part 13, and selects only the image data that is permitted for copying based on the copy permission/inhibition tag information issued by the authentication controller 15, and outputs the image data being selected to the print part 18. The print part 18 prints the image data directed to be printed by the print controller 17.

Figure 4:
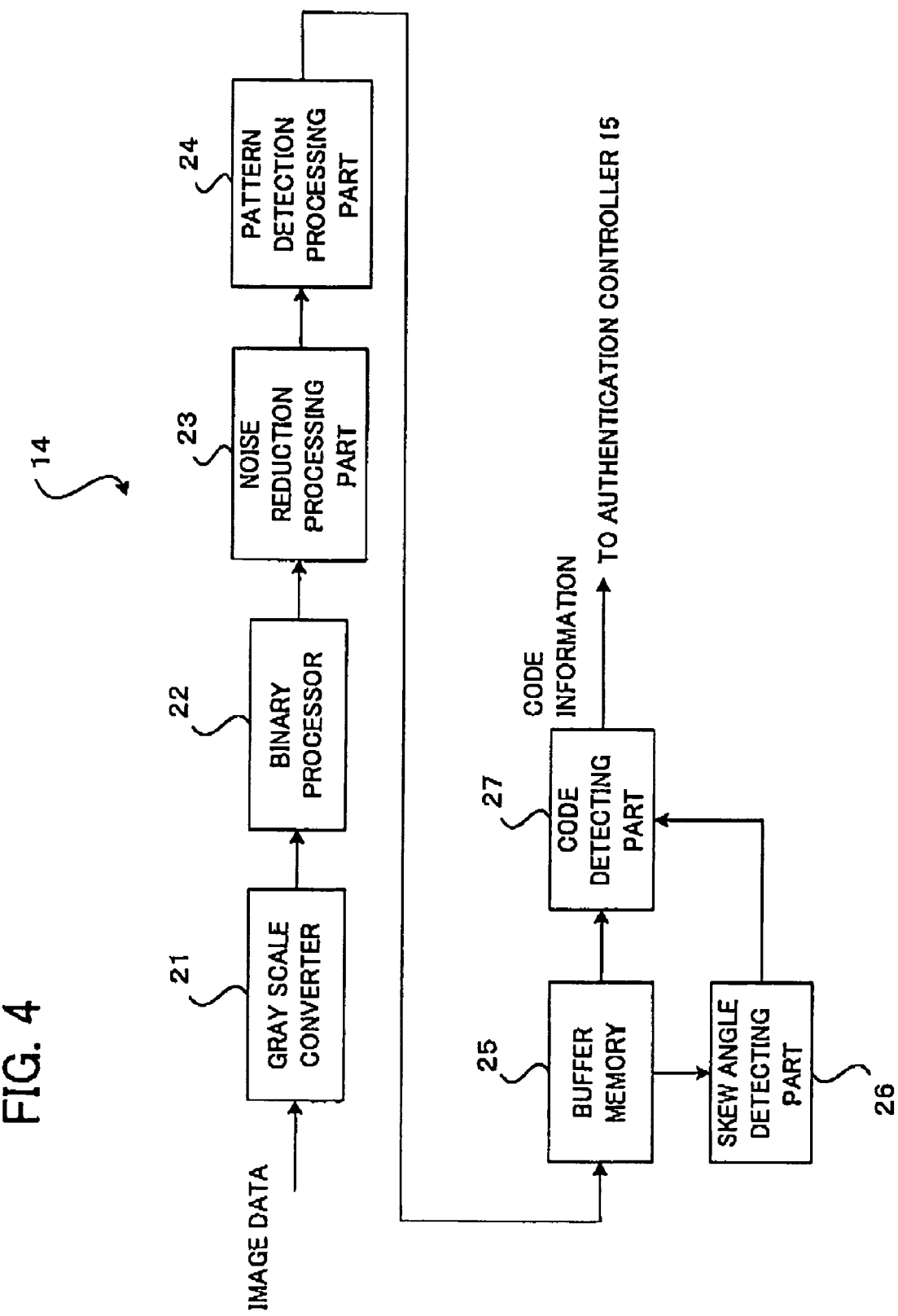
FIG. 4 is a block diagram showing a configuration of a code information extracting part 14 that is shown in FIG. 3.

Next, a configuration of the code information extracting part 14 that is shown in FIG. 3 will be explained with reference to the block diagram as shown in FIG. 4.

As shown in FIG. 4, the code extracting part 14 incorporates a gray scale converter 21, a binary processor 22, a noise reduction processing part 23, a pattern detection processing part 24, a buffer memory 25, a skew angle detecting part 26, and a code detecting part 27.

The image data outputted from the scanner part 11 is inputted into the gray scale converter 21 where the image data is converted from full color scale to gray scale, and then converted into binary value by the binary processing part 22.

Next, the image data converted into binary value is inputted into the noise reduction processing part 23, and subjected to the noise reduction processing. The image data of which the noise has been reduced is inputted into the pattern detecting processing part 24, and the code information embedded into the document is subjected to the pattern detection. For example, if the code information is embedded in the document by use of a glyph code, the pattern detection processing part 24 subjects the image data after the noise direction to a process to detect two types of slash pattern, and a result of the process is stored in the buffer memory 25. This image data has a pixel value "0" at a position where a slash pattern corresponding to "bit 0" is detected, and has a pixel value "0" at a position where a slash pattern corresponding to "bit 1" is detected.

The skew angle detecting part 26 detects a skew angle with regard to the image data stored in the buffer memory 25. In this process here, a skew angle of the inputted image data is obtained. As a specific way to obtain this skew angle, the pixel having the pixel value "0" or "1" is subjected to the Hough transform, and a peak of distribution obtained by projecting the transformed result onto the angular axis is detected to obtain the skew angle. The skew angle being obtained is outputted to the code detecting part 27.

The code detecting part 27 reads the image data stored in the buffer memory 25 and detects the code information embedded in the image data by use of the skew angle detected by the skew angle detecting part 26.

Next, a configuration of the authentication controller 15 as shown in FIG. 3 will be explained, with reference to FIG. 5.

Figure 5:
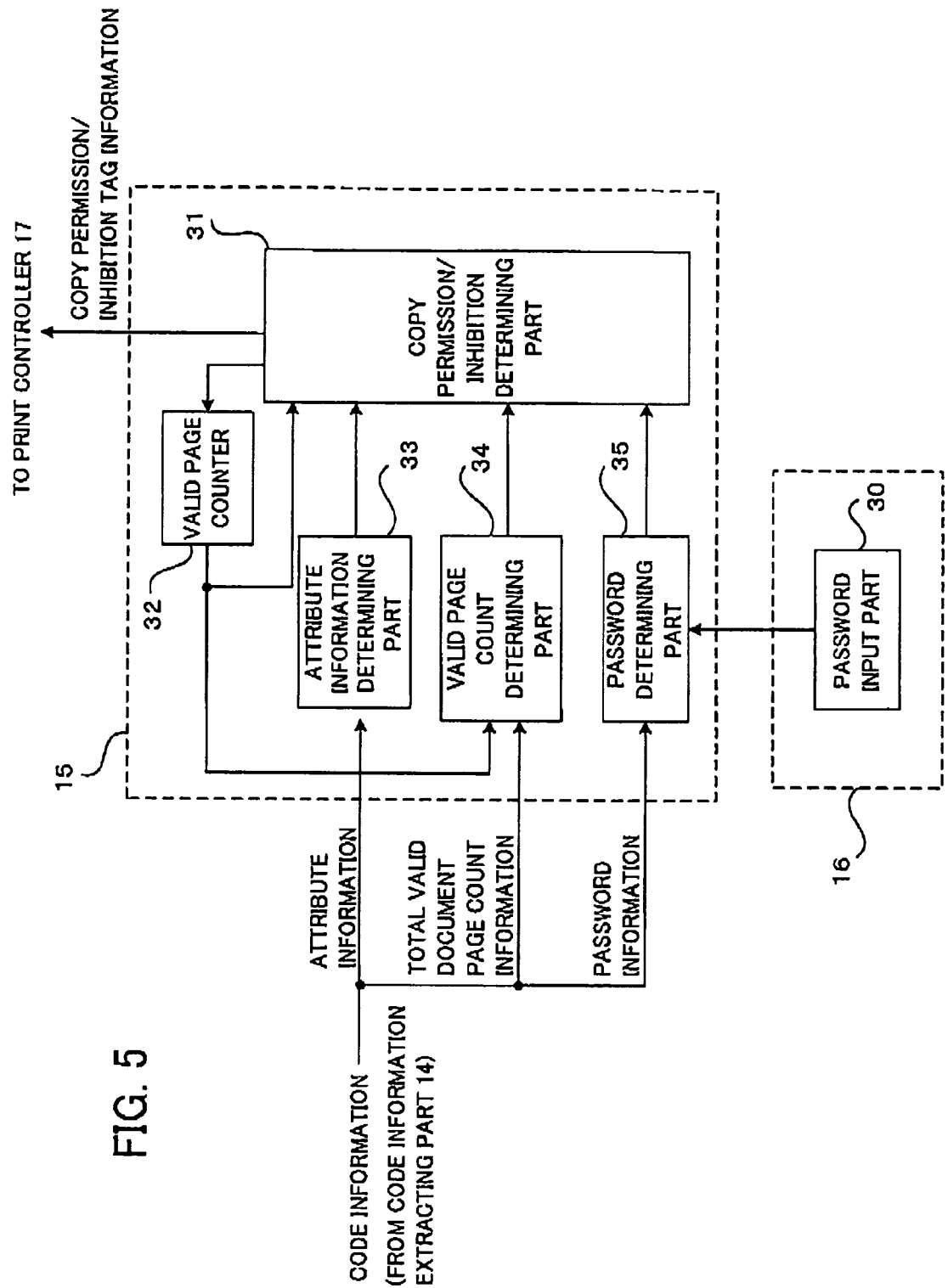
FIG. 5 is a block diagram showing a configuration of an authentication controller 15 that is shown in FIG. 3.

As shown in FIG. 5, the authentication controller 15 incorporates a copy permission/inhibition determining part 31, a valid page counter 32, an attribute information determining part 33, a valid page count determining part 34, and a password determining part 35. The user interface part 16 is provided with a password input part 30 to input the password entered by the user.

The valid page counter 32 is a counter that increments a count value by one every time the copy permission/inhibition determining part 31 counts up, and the valid page counter 32 outputs the count value to the valid page count determining part 34 and the copy permission/inhibition determining part 31.

The attribute information determining part 33 determines whether or not the attribute information extracted by the code information extracting part 14 matches the attribute information in each document.

The valid page count determining part 34 compares the counter value of the valid page counter 32 with the total valid document page count information, and determines whether or not the count value of the valid page counter 32 satisfies the following:

$$\text{Count value of the valid page counter } 32 \leq (\text{Total valid document page count} - 1),$$

and the result of the determination is outputted to the copy permission/inhibition determining part 31.

The password determining part 35 determines whether or not the password information inputted by the password input part 30 matches the password information extracted by the code information extracting part 14.

The copy permission/inhibition determining part 31 determines whether copying is permitted or inhibited with respect to each document, as to the image data accumulated in the image accumulating part 13, based on the results of determination in the attribute information determining part 33, the valid page count determining part 34, and the password determining part 35, and this determination result is outputted to the print controller 17 as copy permission/inhibition tag information.

Specifically, the copy permission/inhibition determining part 31 determines the copy permission/inhibition of each of the documents, according to the algorithm as the following:

1) Entry of password information is requested for the first page of the document, with respect to a document group including documents each having the identical attribute information;

2) For the second page and subsequent pages, copying is permitted if the password information is the same as the password information for the first page; and
3) For the second page and subsequent pages, even if the password information is different from that of the first page, copying is permitted as far as the attribute information is the same. It is to be noted that only the document the number of which is within the count from the first page, the count corresponding to the total valid document page count, is permitted to be copied.

Figure 6:
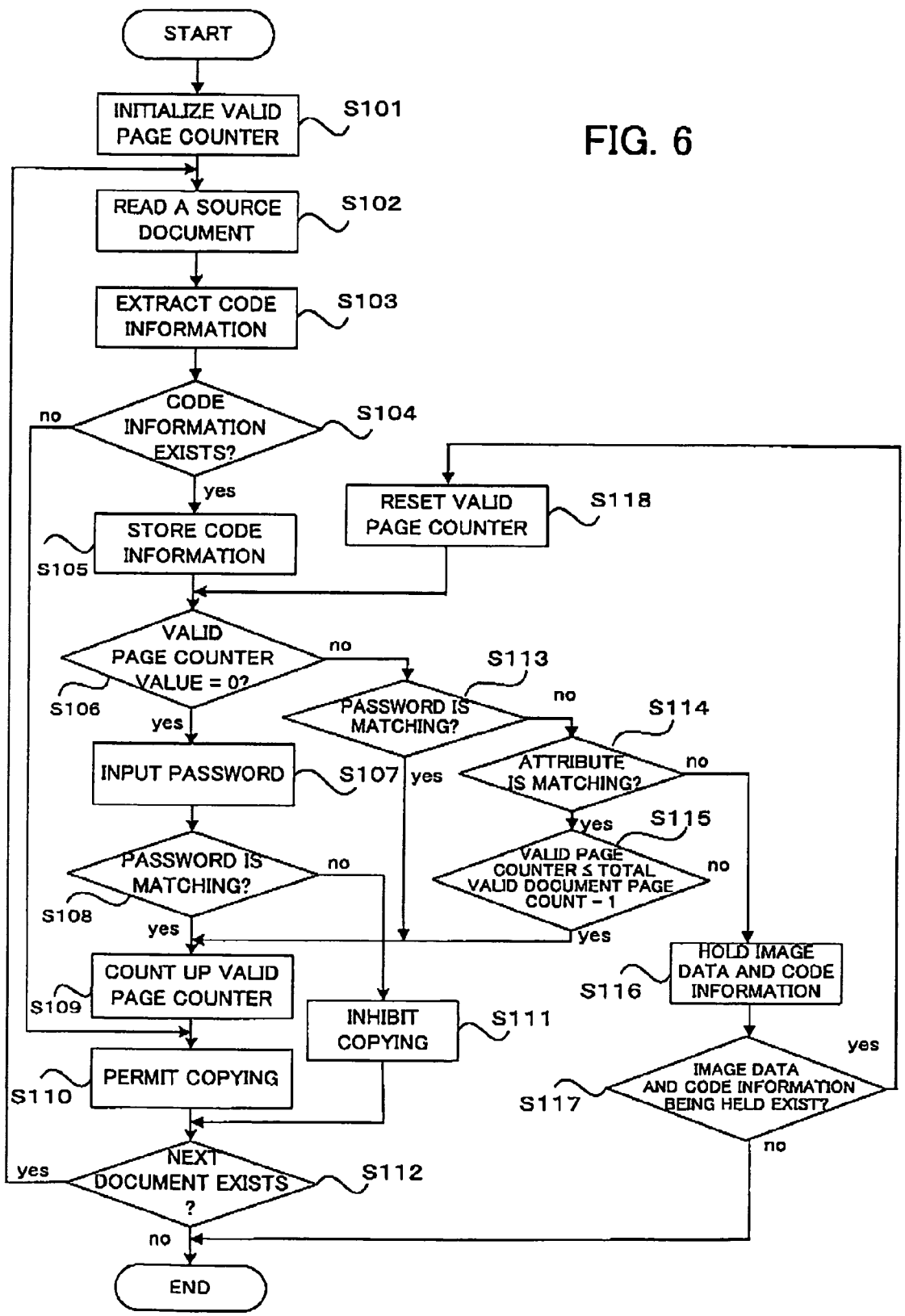
FIG. 6 is a flowchart showing an operation of the image processor according to one exemplary embodiment of the present invention.

Next, an operation of the image processor according to the present exemplary embodiment of the invention will be explained with reference to the flowchart as shown in FIG. 6.

Firstly, the copy permission/inhibition determining part 31 initializes the valid page counter 32 to set the counter value to "0" (step S101). When the user sets a document as a copying target on the scanner part 11 and reading of the document starts, the image data read by the scanner part 11 is processed by the scanned image processor 12, and then accumulated in the image accumulation part 13 (step S102). Then, the code information extracting unit 14 extracts, from the image data of multiple documents read by the scanner part 11, code information including the password information, the page number, the total valid document page count information, and the attribute information (step S103).

Here, when it is determined that the code information is not embedded in the document read by the code information extracting unit 14 (step S104), the copy permission/inhibition determining part 31 issues copy permission tag information to the document (step S110).

When it is determined in step S104 that the code information is extracted by the code information extracting part 14, the code information being extracted is stored in the buffer memory 25 (step S105) and outputted to the authentication controller 15.

Next, it is determined whether the count value of the valid page counter 32 is "0", that is, whether or not the document currently subjected to the authentication process is the first page (step S106). In this particular example, the first page is subjected to the authentication process. Therefore, password information is inputted by the password input part 30 (step S107), and the password determining part 35 determines whether or not the inputted password information matches the password information extracted by the code information extracting part 14 (step S108). When it is determined that there is a match between these password information items, the copy permission/inhibition determining part 31 counts up the valid page counter 32 (step S109), and issues copy permission tag information indicating that copying of the first page is permitted (step S110). If there is not a match between these password information items in step S108, the copy permission/inhibition determining part 31 issues copy inhibition tag information indicating that copying of the first page is inhibited (step S111).

Then, it is determined whether or not there exists a next document (step S112), and if the next document exists, the process returns to step S102. The same processes in step S102 to step S105 as described above are carried out for the second page and subsequent pages. As for the documents on the second and subsequent pages, it is determined in step S106 that the count value of the valid page counter 32 is not "0". Therefore, the password determining part 35 determines whether or not the password information used in the authentication process for the first page matches the password information in the document currently subjected to the authentication process (step S113).

If it is determined in step S113 that there is a match between the password information items, the copy permission/inhibition determining part 31 counts up the valid page counter 32 (step S109), and issues copy permission tag information indicating that copying of the document currently being subjected to the authentication process is permitted (step S110). In other words, as for the multiple documents to which the same password is set, the authentication process is carried out without requesting reentry of the password information.

If it is determined in step S113 that there is no match in the password information items, the attribute information determining part 33 determines whether or not the attribute information on the first page document matches the attribute information of the document currently subjected to the authentication process (step S114). If it is determined in step S114 that there is a match in the attribute information items, the valid page count determining part 34 determines whether or not the count value of the valid page counter 32 is equal to or less than the value that is obtained by subtracting one from the total valid document page count in the extracted code information (step S115).

In other words, the valid page count determining part 34 determines whether or not the following formula is satisfied:

Count value of the valid page counter 32≦Total valid document page count−1

If it is determined that the above formula is satisfied in step S115 (step S109), the copy permission/inhibition determining part 31 counts up the valid page counter 32 (step S109), and issues the copy permission tag information that permits copying of the document that is currently subjected to the authentication process (step S110) In other words, the copy permission/inhibition determining part 31, which functions as a permitting unit, permits copying of the document having the same attribute information as the attribute information included in the first page document determined as having identical password information by the password determining part 30, under the condition that the page count already permitted copying is equal to or less than the total valid document page count.

If there is no match in the attribute information items, or the count value of the valid page counter 32 does not satisfy the condition, the image data and the code information of this document are held so that the image data will be subjected to an ordinary authentication process at a later time (step S116, S117) the valid page counter 32 is reset (step S118), and the process returns to step S106. Therefore, the ordinary authentication process is performed requesting an entry of a password in the similar manner as the first page (step S107, S108).

Next, an operation of the image processor according to the present exemplary embodiment of the invention will be explained with reference to the specific example as shown in FIG. 7.

In the particular example as shown in FIG. 7, one group of documents incorporates five pages. This document group has a setting of information "Presentation materials 060519", as attribute information. Here, it is assumed that password information items PWD1 to PWD5 are respectively set in these five documents. It is further assumed that "5" is set as the total valid document page count information. Page numbers "1" to "5" are respectively set in the five documents.

In other words, these five documents have settings of page numbers and password information, different from one another, but they have identical total valid document page count information and identical attribute information.

If the image processor according to the present exemplary embodiment of the invention is allowed to read the group of documents having the settings as described as shown in FIG. 7, a user who wants to copy these five documents is required to enter the password information PWD 1 only, because these five documents have the same value as the attribute information and the total valid document page count information set to "5". In other words, as far as the same attribute information as that of the first page is embedded, copying of the documents up to the page "5" that is set as the total valid document page count information is permitted, without a comparison of the password information.

In the present exemplary embodiment, as for the second and subsequent pages, copying is permitted under the condition that those documents have the same attribute information as that of the first page, and the page count having been subjected to the authentication in one group of document is equal to or less than the total valid document page count. However, the copying may be permitted by use of only the attribute information. In the case above, if the first page is authenticated by the password information, copying of the second page and the subsequent pages are permitted as far as the attribute information is the same.

If copying is carried out under the condition that documents belonging to different groups are mixed, the documents are classified based on the attribute information, and each document is sorted in the order of the page number included in the code information. Therefore, it is further possible to copy the documents that are arranged in numerical order of the page number.

MODIFIED EXAMPLE

In the exemplary embodiment as described above, an explanation has been made taking up an example that the present invention is applied to an image forming apparatus such as a copying machine, which copies a confidential document. However, the present invention is not limited to this example but it may be similarly applied to any type of an image processor that scans a document, such a scanner and a facsimile machine.

In the exemplary embodiment as described above, an explanation has been made taking an example that prevents copying or scanning of a confidential document in which confidential information is embedded. However, the present invention is not limited to this case, but it may be similarly applied to any type of a document that needs to prevent copying or scanning, such as a copyrighted work and paper money.

Furthermore, in the exemplary embodiment as described above, an explanation has been made based on a functional configuration of the image processor. However, it is further possible to implement the operations as described above by configuring the image processor using a general-use computer, and then executing an image processing program for carrying out the processing as described above. This image processing program is read and installed, from a recording medium such as a magnetic disk and a semiconductor memory, not illustrated, thereby controlling the operation of the image processor.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processor, comprising:
an image reading unit that reads source documents and converts read data into image data,
an extracting unit that extracts password information and attribute information from the image data of each of the source documents read by the image reading unit,
a password inputting unit that inputs the password information,
a password determining unit that determines whether or not the password information inputted by the password inputting unit matches the password information extracted by the extracting unit,
a source document determining unit that determines whether or not a source document read by the image reading unit is a first page,
an attribute determining unit that determines whether or not the attribute information extracted from the first page and an attribute information extracted from the read source document match, under the condition that the source document determining unit determines that the source document read by the image reading unit is not the first page,
a permitting unit that:
directs the password determining unit to determine whether or not the password information inputted by the password inputting unit matches the password information extracted by the extracting unit, under the condition that the source document determining unit determines that the read source document is the first page,
then if the password determining unit has determined that there is a match between the inputted password information and the extracted password information, permits the read source document to be printed,
directs the attribute determining unit to determine whether or not the attribute information extracted from the first page and the attribute information extracted from the read source document match, under the condition that the source document determining unit determines that the read source document is not the first page, and
then if the attribute determining unit has determined that there is a match between the attribute information extracted from the first page and the attribute information extracted from the read source document, permits the read source document to be printed, wherein
the attribute information extracted from the image data of each of the source documents indicates a particular document group that each document belongs, and
each document of a common document group has the identical attribute information.

2. The image processor according to claim 1, further comprising:
a source document page counter that counts the pages of the source document permitted to print, wherein
the extracting unit extracts further extracts a total valid document page count that is information indicating a page count of the source document that is permitted to print from among the source documents belonging to one document group, under the condition that the source document determining unit determines that the read source document is not the first page, the permitting unit:
  directs the attribute determining unit to determine whether or not the attribute information extracted from the first page and the attribute information extracted from the read source document match,
  then permits the read source document to be printed, under the condition that the attribute determining unit has determined that there is a match between the attribute information extracted from the first page and the attribute information extracted from the read source document, and the page count already permitted to print is equal to or less than the total valid document page count extracted by the extract unit.

3. The image processor according to claim 1, wherein the permitting unit directs the password inputting unit to input the password information for the read source document, under the condition that the source document determining unit determines that the read source document is not the first page and the attribute determining unit has determined that there is a match between the attribute information extracted from the first page and the attribute information extracted from the read source document.

4. The image processor according to claim 1, wherein the attribute information is information that indicates to which document group a source document belongs.

5. The image processor according to claim 1, wherein the permitting unit permits an image processing of a source document without requesting an input of password information, if the attribute information of the source document is identical to the attribute information included in the source document of which the password determining unit has determined that there is a match between the inputted password information and the extracted password information.

6. An image processor, comprising:
  an image reading unit that reads source documents and converts read data into image data,
  an extracting unit that extracts password information and attribute information from the image data of each of the source documents read by the image reading unit,
  a password inputting unit that inputs the password information,
  a password determining unit that determines whether or not the password information inputted by the password inputting unit matches the password information extracted by the extracting unit,
  a source document determining unit that determines whether or not the source document read by the image reading unit is the first page,
  a permitting unit that permits a first source document of which it has been determined that there is a match between the inputted password information and the extracted password information to print, under the condition that the source document determining unit determines that the read source document is the first page, and
  an attribute determining unit that determines whether or not the attribute information of the first source document and an attribute information extracted from the source document read by the image reading unit match, under the condition that the source document determining unit determines that the source document read by the image reading unit is not the first page, wherein
  the permitting unit permits a second source document of which it has been determined that there is a match between the attribute information of the second source document and the attribute information of the first document, to print without requesting an input of password information, under the condition that the source document determining unit determines that the read source document is not the first page,
  the attribute information extracted from the image data of each of the source document indicates a particular document group that each document belongs, and
  each document of a common document group has the identical attribute information.

7. An image processing method, comprising:
  reading source documents and converting read data into image data,
  extracting password information and attribute information from the image data of each of the read source documents,
  inputting the password information,
  determining whether or not the inputted password information matches the password information extracted from the read image data,
  determining whether or not a read source document is a first page,
  determining whether or not the attribute information extracted from the first page and an attribute information extracted from the read source document match, under the condition that it is determined that the source document read by the image reading unit is not the first page,
  executing the determination of whether or not the inputted password information matches the extracted password information, under the condition that it is determined that the read source document is the first page,
  then if it is determined that that there is a match between the inputted password information and the extracted password information, permiting the read source document to be printed,
  executing the determination of whether or not the attribute information extracted from the first page and the attribute information extracted from the read source document match, under the condition that it is determined that the read source document is not the first page, and
  then if it is determined that there is a match between the attribute information extracted from the first page and the attribute information extracted from the read source document, permitting the read source document to be printed, wherein
  the attribute information extracted from the image data of each of the read source documents indicates a particular document group that each document belongs, and
  each document of a common document group has the identical attribute information.

8. An image processing method, comprising:
  reading source documents and converting read data into image data,
  extracting password information and attribute information from the image data of each of the read source documents,
  inputting the password information,
  determining whether or not the inputted password information matches the password information extracted from the read image data,
  determining whether or not the source document read by the image reading unit is the first page,
  permitting a first source document of which it has been determined that there is a match between the inputted password information and the extracted password information to print, under the condition that it is determined that the read source document is the first page, determining whether or not the attribute information of the first source document and an attribute information extracted from the read source document match, under the condition that it is determined that the read source document is not the first page, and permitting a second source document of which it has been determined that there is a match between the attribute information of the second source document and the attribute information of the first document to print without requesting an input of password information, under the condition that it is determined that the read source document is not the first page, wherein the attribute information extracted from the image data of each of the read source documents indicates a particular document group that each document belongs, and each document of a common document group has the identical attribute information.

9. A non-transitory computer readable medium storing a program causing a computer to execute a process comprising:

reading source documents and converting read data into image data, extracting password information and attribute information from the image data of each of the read source document, inputting password information, determining whether or not the inputted password information matches the password information extracted from the read image data, determining whether or not a read source document is a first page, determining whether or not the attribute information extracted from the first page and an attribute information extracted from the read source document match, under the condition that it is determined that the source document read by the image reading unit is not the first page, executing the determination of whether or not the inputted password information matches the extracted password information, under the condition that it is determined that the read source document is the first page, then if it is determined that that there is a match between the inputted password information and the extracted password information, permitting the read source document to be printed, executing the determination of whether or not the attribute information extracted from the first page and the attribute information extracted from the read source document match, under the condition that it is determined that the read source document is not the first page, and then if it is determined that there is a match between the attribute information extracted from the first page and the attribute information extracted from the read source document, permitting the read source document to be printed, wherein the attribute information extracted from the image data of each of the read source documents indicates a particular document group that each document belongs, and each document of a common document group has the identical attribute information.

10. A non-transitory computer readable medium storing a program causing a computer to execute a process comprising:

reading source documents and converting read data into image data, extracting password information and attribute information from the image data of each of the read source documents, inputting the password information, determining whether or not the inputted password information matches the password information extracted from the read image data, determining whether or not the source document read by the image reading unit is the first page, permitting a first source document of which it has been determined that there is a match between the inputted password information and the extracted password information to print, under the condition that it is determined that the read source document is the first page, determining whether or not the attribute information of the first source document and an attribute information extracted from the read source document match, under the condition that it is determined that the read source document is not the first page, and permitting a second source document of which it has been determined that there is a match between the attribute information of the second source document and the attribute information of the first document to print without requesting an input of password information, under the condition that it is determined that the read source document is not the first page, wherein the attribute information extracted from the image data of each of the read source documents indicates a particular document group that each document belongs, and each document of a common document group has the identical attribute information.

11. An image processor, comprising:

an image reading unit that reads source documents and converts read data into image data, an extracting unit that extracts password information and attribute information from the image data of each of the source documents read by the image reading unit, a password inputting unit that inputs the password information, a password determining unit that determines whether or not the password information inputted by the password inputting unit matches the password information extracted by the extracting unit, and a permitting unit that permits an image processing of a first source document of which the password determining unit has determined that there is a match between the inputted password information and the extracted password information and permits an image processing of a second source document, if the attribute information of the second source document is identical to the attribute information included in the first source document, wherein the attribute information extracted from the image data of each of the read source documents indicates a particular document group that each document belongs, and each document of a common document group has the identical attribute information, but different password information.

12. The image processor according to claim 11, wherein the source document read by the image reading unit records a total valid document page count that is information indicating a page count of the source document that is permitted to be subjected to the image processing by use of the identical password information, and the permitting unit permits the image processing of a second source document having the identical attribute information, under a condition that the page count already permitted to be subjected to the image processing is equal to or less than the total valid document page count.

13. The image processor according to claim 11, wherein the attribute information is information that indicates to which document group a source document belongs.

14. The image processor according to claim 11, wherein the permitting unit permits an image processing of a second source document without requesting an input of password information, if the attribute information of the second source document is identical to the attribute information included in the first source document.

15. The image processor according to claim 11, wherein the permitting unit permits the image processing of a second source document of the document group without requesting an input of password information for processing of the second document, under the condition that the attribute information of the second source document is identical to the attribute information included in the source document of the document group, the second document including different password information than the source document.

* * * * *